United States Patent [19]

Kawamura et al.

[11] Patent Number: 4,734,864
[45] Date of Patent: Mar. 29, 1988

[54] NUMERICAL CONTROL APPARATUS WITH PROGRAMMABLE MIRROR IMAGE FUNCTION

[75] Inventors: Hideaki Kawamura; Takao Sasaki, both of Hachiouji, Japan

[73] Assignee: Fanuc Ltd., Minamitsuru, Japan

[21] Appl. No.: 823,498

[22] PCT Filed: May 21, 1985

[86] PCT No.: PCT/JP85/00277
§ 371 Date: Jan. 21, 1986
§ 102(e) Date: Jan. 21, 1986

[87] PCT Pub. No.: WO85/05473
PCT Pub. Date: Dec. 5, 1985

[30] Foreign Application Priority Data

May 22, 1984 [JP] Japan .................................. 59-101757

[51] Int. Cl.⁴ .............................................. G06F 15/46
[52] U.S. Cl. ...................... 364/474; 364/191
[58] Field of Search .................. 364/188–193, 364/474, 475, 513, 167, 170, 171; 318/567

[56] References Cited

U.S. PATENT DOCUMENTS

| | | | |
|---|---|---|---|
| 4,150,427 | 4/1979 | Slawson | 364/474 |
| 4,314,330 | 2/1982 | Slawson | 364/191 |
| 4,495,561 | 1/1985 | Matsuura et al. | 364/474 |
| 4,495,588 | 1/1985 | Nio et al. | 364/191 |
| 4,591,968 | 5/1986 | Nozawa | 364/474 |

FOREIGN PATENT DOCUMENTS 0126712  7/1985  Japan ................................. 364/191

*Primary Examiner*—Jerry Smith
*Assistant Examiner*—Allen MacDonald
*Attorney, Agent, or Firm*—Staas & Halsey

[57] ABSTRACT

Numerical control apparatus for controlling a mirror image function in a machining program. When a mirror image code and a position for each coordinate axis with a mirror are set (steps S2, S4, S7), mirror image instruction executing data (FX=1, FY=1) and mirror positions (XM, YM) are set for the coordinate axis with the mirror (steps S5, S6, S8, S9). Shift instruction values (Xi, Yi) Programmed in response to the execution data and mirror positions are converted to mirror image shift instruction values (2XM−Xi, 2YM−Yi) (steps S12, S15), and the mirror image shift instruction values are output (step S16). NC machining is executed according to the mirror image shift instruction values.

3 Claims, 3 Drawing Figures

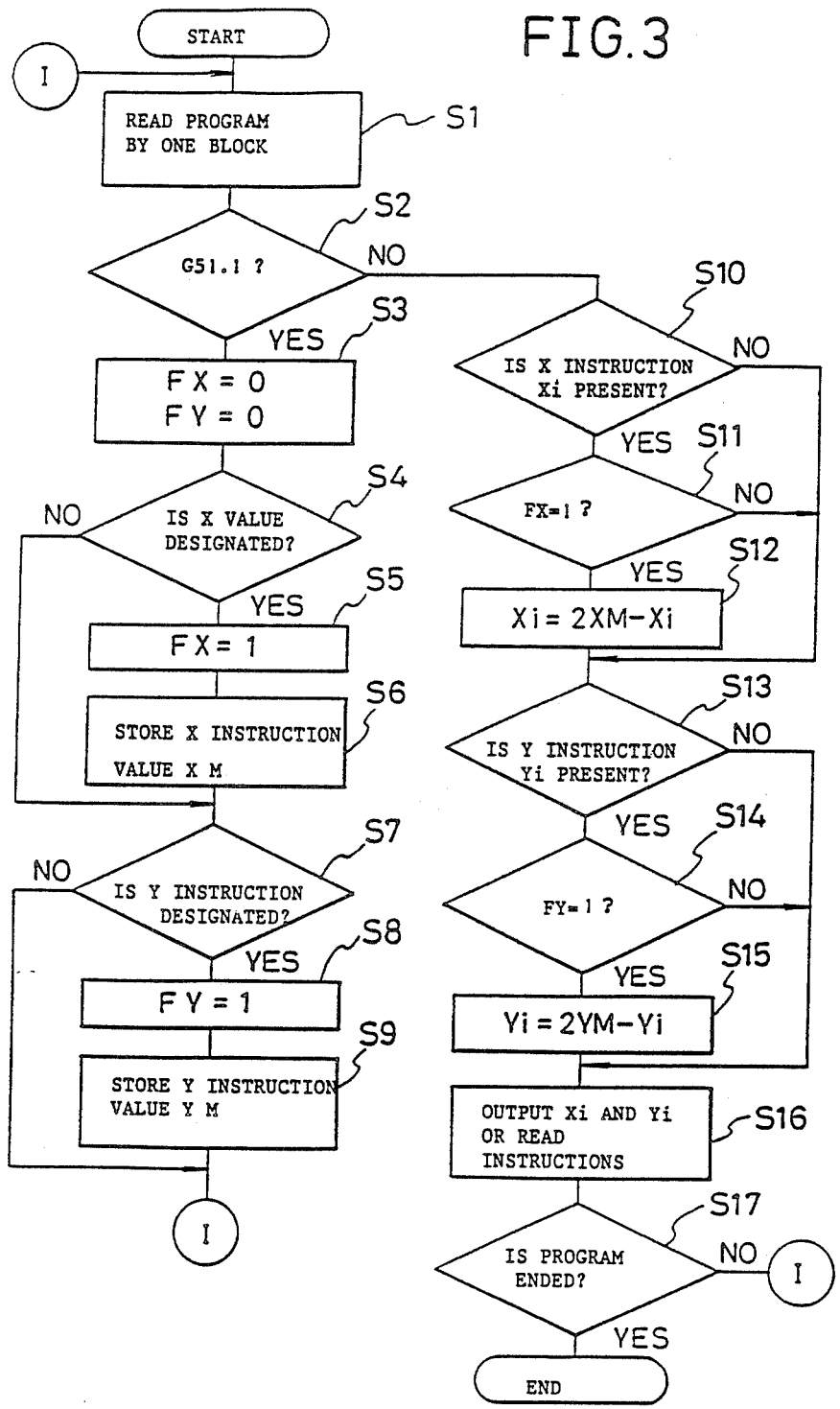

NUMERICAL CONTROL APPARATUS WITH PROGRAMMABLE MIRROR IMAGE FUNCTION

BACKGROUND OF THE INVENTION

The present invention relates to a numerical control apparatus and, more particularly, to a numerical control apparatus which can easily control a mirror image function from a program.

A conventional numerical control apparatus is known which has a mirror image function for inverting a shift amount instruction code of a machining program using switches on an operation panel of the numerical control apparatus, or using the program itself. In a conventional numerical control apparatus of this type, as shown in FIG. 1, a workpiece is machined to a shape AX derived from a shape A defined by points P1, P2 and P3 when a mirror is placed at a position XM along the X axis, a shape AY derived from the shape A when the mirror is placed at a position YM along the Y axis, or a shape AXY when mirrors are placed at the positions XM and XY along the X- and Y-axes. Such machining can be performed using a mirror image function without entering a shape AX, AY, or AXY instruction.

The conventional mirror image function, however, can only be turned on or off by a switch or a program; mirror position cannot be designated. For this reason, a shape to be subjected to mirror image processing must be shifted to a position where a mirror has been placed.

SUMMARY OF THE INVENTION

It is an object of the present invention to provide a numerical control apparatus with a programmable mirror image function, wherein the conventional drawbacks can be eliminated, and the mirror ON/OFF operation and mirror position can be controlled by a program.

In order to achieve the above object of the present invention, an NC processing program is read by a program reading means, and a mirror image discriminating means discriminates whether a mirror image code and at least one coordinate axis along which a mirror is placed, are set in the read program. There are also provided: a mirror image instruction storage means for storing execution data for the at least one coordinate axis with the mirror, the execution data representing that the mirror image instruction is being executed, and for clearing the execution data for the other coordinate axis; and a storage means for storing a mirror position designated by a program for each coordinate axis. For the coordinate axis corresponding to the data stored in the mirror image instruction storage means, a shift instruction value fetched from the program is converted, in accordance with the mirror position stored in the mirror position storage means, by a shift instruction value converting means, to a new shift instruction value representing a position given upon reflection of the shift instruction value by a mirror. If a mirror position for a coordinate axis is not designated, the shift instruction value derived from the program is generated without processing. Mirror image processing is thus performed. When the mirror image operation is to be cancelled, only the mirror image code is programmed, thereby clearing the data stored in the mirror image instruction storage means for each axis.

According to the present invention, the mirror image function can be set and cancelled and the mirror position can be designated by the program. The program is simple, and unnecessary shifting of the shape to be processed can be eliminated. The mirror image function is thus utilized without program limitations.

BRIEF DESCRIPTION OF THE DRAWINGS

FIG. 3 is a flow chart for explaining the operation of the apparatus in FIG. 2.

DETAILED DESCRIPTION OF THE PREFERRED EMBODIMENT

Figure 2:
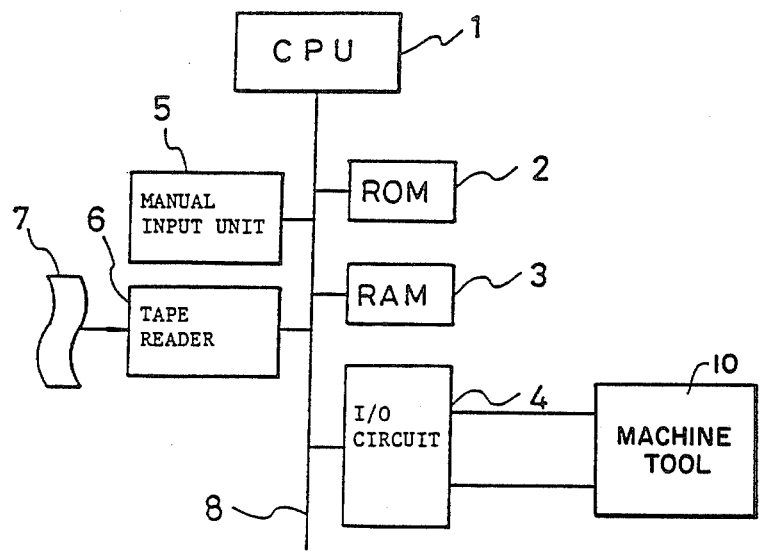
FIG. 2 is a block diagram of a numerical control apparatus with a programmable mirror image function according to an embodiment of the present invention.

FIG. 2 is a block diagram of a numerical control apparatus with a programmable mirror image function according to an embodiment of the present invention. Reference numeral 1 denotes a central processing unit (CPU); 2, a ROM for storing the program which controls the overall system of the numerical control apparatus; 3, a RAM for temporarily storing processed data; 4, an I/O port connected to a servo motor (not shown) or the like of a machine tool 10 or the like; 5, a manual input unit; 6, a tape reader for reading a program from an NC program tape 7; and 8, a bus.

The operation of the numerical control apparatus with a programmable mirror image function will now be described.

In this embodiment, the mirror image function and mirror coordinate position are designated by the following statement (1):

$$G51.1X\_\_\_\_Y\_\_\_\_; \qquad (1)$$

In order to cancel the mirror image function, the mirror image instruction code G51.1 is programmed:

$$G51.1; \qquad (2)$$

Figure 1:
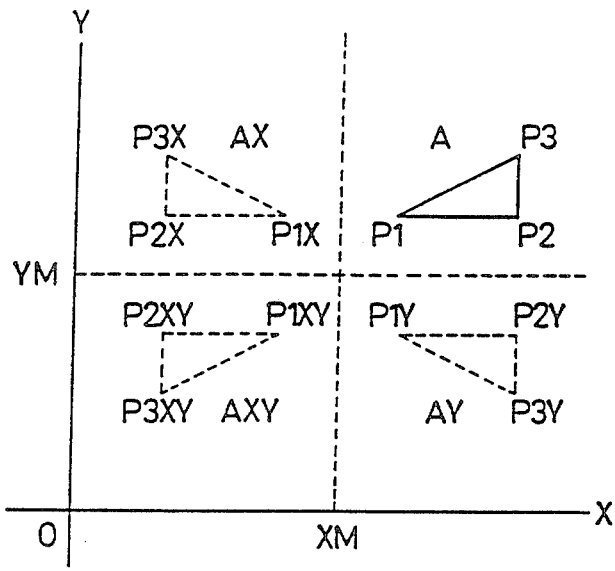
FIG. 1 is a diagram for explaining a mirror image function.

When a statement (3) below is programmed:

$$G51.1X1000; \qquad (3)$$

the operation is performed with the mirror placed at position 1000 along the X-axis. The shape AX machining instruction shown in FIG. 1 is thus executed.

When the following statement (4) is programmed:

$$G51.1X1000\ Y500 \qquad (4)$$

the operation is performed with the mirrors respectively located at position 1000 along the X-axis and position 500 along the Y-axis. In other words, the shape AXY machining instruction shown in FIG. 1 is generated.

The NC program tape 7 containing the programmed mirror image function is then placed in the tape reader 6. The tape is started, the numerical control apparatus performs processing in accordance with the flow of FIG. 3, and the processed data is supplied to a machine tool or the like.

The CPU 1 fetches the program from the NC program tape 7 through the tape reader 6 in units of blocks (step S1). In step S2, the CPU 1 checks whether or not the mirror image instruction code G51.1 has been entered. If NO in step S2, the CPU 1 jumps to step 10 and checks whether or not a shift instruction Xi for the X-axis has been entered. If NO in step S10, or if a flag FX is not set at logic "1" (step S11) even if YES in step S10 (the flag FX is set at logic "1" representing that the mirror image instruction is being executed upon generation of the mirror image function instruction to be described later), the CPU 1 supplies a normal NC instruction to the machine tool or the like. In step 13, the CPU 1 checks whether or not a shift instruction Yi for the Y-axis has been entered. If NO in step S13, or if a flag FY is not set at logic "1" (step S14) even if YES in step S13, a normal NC instruction is supplied to the machine tool or the like. When the workpiece is machined to obtain shape A defined by P1, P2, and P3 as shown in FIG. 1, the operations in steps S1, S2, S10, S11, S13, S14 and S16 in FIG. 3 are performed to generate the normal shift instructions Xi and Yi. However, when the read program does not contain the shift instructions Xi or Yi, processing is executed through steps S1, S2, S10, and S13, and the read instruction outputs are generated in step S16.

If the mirror image instruction code G51.1 is read in step S2, the X and Y flags FX and FY are cleared to zero (step S3). The CPU 1 then checks in step S4 whether or not the mirror image instruction code G51.1 and the mirror position have been entered. If NO in step S4, the flow jumps to step S7. However, if YES in step S4, the X flag FX is set at logic "1" (step S5), and the input X-axis mirror position X is stored (step S6). Similarly, the CPU 1 checks in step S7 whether or not a Y-axis mirror position has been entered. If NO in step S7, the flow returns to step S1. However, if YES in step S7, the Y flag FY is set at logic "1" and the Y-axis mirror position is stored (steps S8 and S9). Thereafter, the flow returns to step S1. The operations in steps S3 to S9 set the mirror image function and the correponding mirror positions.

The next program block is read (step S1), and the shift instruction Xi for the X-axis is read (steps S2 and S10). When the X flag FX is set at logic "1" (step S11), the mirror is located on the X-axis. The CPU 1 then performs the following processing in accordance with the X mirror position X and the instruction value Xi read from the program (step S12).

$$XM - (Xi - XM) = 2XM - Xi \quad (5)$$

The new instruction value Xi is then stored.

$$Xi = 2XM - Xi \quad (6)$$

The above relationship will be described with reference to FIG. 1. For example, if the X-axis position P1 is given as Xi, a difference (Xi−XM) indicates a distance between the X mirror coordinate and P1. When this distance is subtracted from the X mirror position XM, the X coordinate position P1X is calculated as follows:

$$X \text{ coordinate position } P1X = XM - (Xi - XM) \quad (7)$$
$$= 2XM - Xi$$

In this manner, the new instruction value Xi represents X coordinate position P1X in FIG. 1. Similarly, X coordinate positions P2 and P3 are converted and X coordinate positions P2X and P3X are stored.

When the shift instruction Yi for the Y-axis is designated (step S13) and the Y flag FY is set at logic "1" (step S14), that is, when the mirror is located along the Y-axis, the same processing as for the X-axis is performed to derive a new Y-axis instruction value Yi using equation (8):

$$Yi = 2YM - Yi \quad (8)$$

Using these new values Xi and Yi (generated in step S16), a mirror processing instruction is generated such that the mirror(s) is (are) located along one or both of the X- and Y-axes.

When the X flag FX is set at logic "1" and the mirror is located at the X position X, the new shift instruction Xi (=2XM−Xi) is calculated in step S12 in accordance with the X shift instruction value Xi read from the program. The calculated value is generated as Xi in step S16. Since the Y flag FY is not set at logic "1", the shift instruction value Yi read from the program is generated without processing. The workpiece is thus machined to obtain the shape AX derived from the shape A when the mirror is placed at the mirror position X as shown in FIG. 1. Similarly, when only the Y flag FY is set at logic "1", the machining instruction for the shape AY formed when the mirror is located at the mirror position YM is generated. When both the flags FX and FY are set at logic "1", the shape AXY machining instruction is generated. The operations after step S1 are performed until the program completes execution.

In order to interrupt the mirror image function, only the statement G51.1 is necessary. When the CPU 1 fetches this statement, the flags FX and FY are cleared in step S3. Since the X and Y shift instruction values Xi and Yi are not programmed, the flags FX and FY are not set at logic "1", and the operations in step S12 and S15 are not performed. In the next cycle, the shift instruction value read from the program is generated without processing in step S16. As a result, mirror image output will not be generated.

In the above embodiment, an X- and Y-axis mirror image function is exemplified. However, an X-, Y-, and Z-axis mirror image function can be used equally effectively in the same manner as described above.

What is claimed is:

1. A numerical control apparatus with a programmable mirror image function, comprising:
   program reading means for reading a machining program;
   mirror image code discriminating means for discriminating whether or not a mirror image code and at least one coordinate axis position at which a mirror is placed, are set in the machining program;
   mirror image instruction storage means for storing execution data for only the at least one coordinate axis at which the mirror is placed, and for clearing the execution data for the other coordinate axes, the execution data representing that the mirror image instruction is being executed;
   mirror position storage means for storing a mirror position designated by the machining program for each coordinate axis;
   shift instruction value converting means for converting, for a coordinate axis corresponding to the execution data stored in said mirror image instruction storage means, a shift instruction value read from the machining program to a mirror image shift instruction value in response to the mirror position stored in said mirror position storage means and in accordance with a predetermined conversion equation which is a function of the mirror position and the shift instruction value, and for outputting the mirror image shift instruction value; and means for performing machining for the at least one coordinate axis associated with the stored execution data in accordance with the mirror image shift instruction value, and for performing machining for a coordinate axes other than the at least one coordinate axis in accordance with the shift instruction value.

2. An apparatus according to claim 1, further comprising means for disabling the execution data for all coordinate axes when said mirror image code discriminating means discriminates that only the mirror image code is set in the machining program.

3. A numerical control method for performing a mirror image function, comprising the steps of:
   (a) reading a machining program;
   (b) automatically discriminating whether or not a mirror image code and at least one coordinate axis position at which a mirror is placed, are set in the machining program;
   (c) automatically storing execution data for only the at least one coordinate axis at which the mirror is placed and for clearing the execution data for the other coordinate axes, the execution data representing that the mirror image instruction is being executed;
   (d) automatically storing a mirror position designated by the machining program for each coordinate axis;
   (e) automatically converting, for the at least one coordinate axis corresponding to the execution data stored in said step (c), a shift instruction value read from the machining program to a mirror image shift instruction value in response to the mirror position stored in sid step (d) and in accordance with a predetermined conversion equation which is a function of the mirror position and the shift instruction value, and for outputting the mirror image shift instruction value; and
   (f) executing machining for the at least one coordinate axis associated with the stored execution data in accordance with the mirror image shift instruction value and executing machining for a coordinate axis other than the at least one coordinate axis associated with the stored execution data in accordance with the shift instruction value.

* * * * *

UNITED STATES PATENT AND TRADEMARK OFFICE
CERTIFICATE OF CORRECTION

PATENT NO. : 4,734,864
DATED : MARCH 29, 1988
INVENTOR(S) : HIDEAKI KAWAMURA ET AL.

It is certified that error appears in the above-identified patent and that said Letters Patent is hereby corrected as shown below:

FRONT PAGE [57] ABSTRACT, line 8, "Programmed" should be --programmed--.

Col. 3, line 29, "X is" should be --XM is--;
       line 36, "correponding" should be --corresponding--;
       line 43, "X" (second occurrence) should be --XM--.

Col. 4, line 13, "X," (second occurrence) should be --XM,--;
       line 21, "X" should be --XM--.

Signed and Sealed this

Second Day of August, 1988

Attest:

DONALD J. QUIGG

*Attesting Officer*   *Commissioner of Patents and Trademarks*